United States Patent
Van Rotterdam (10) Patent No.: US 10,546,039 B1
(45) Date of Patent: Jan. 28, 2020

(54) COLOR SCHEME GENERATOR FOR WEB APPLICATIONS

(71) Applicant: CITRIX SYSTEMS, INC., Fort Lauderdale, FL (US)

(72) Inventor: Jeroen Van Rotterdam, Fort Lauderdale, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

(21) Appl. No.: 16/108,381

(22) Filed: Aug. 22, 2018

(51) Int. Cl.
G06F 17/20 (2006.01)
G06F 16/957 (2019.01)
G06F 17/22 (2006.01)
G06K 9/62 (2006.01)
G06T 11/00 (2006.01)

(52) U.S. Cl.
CPC ........ *G06F 16/9577* (2019.01); *G06F 17/227* (2013.01); *G06K 9/6215* (2013.01); *G06T 11/001* (2013.01)

(58) Field of Classification Search
None
See application file for complete search history.

(56) References Cited

U.S. PATENT DOCUMENTS

| | | | | |
|---|---|---|---|---|
| 8,054,317 | B1* | 11/2011 | Wilensky | G06T 11/001 345/589 |
| 8,416,255 | B1* | 4/2013 | Gilra | G01J 3/526 345/593 |
| 9,176,744 | B2 | 11/2015 | Lee | |
| 9,538,345 | B2 | 1/2017 | Sah et al. | |
| 2006/0044324 | A1* | 3/2006 | Shum | G06T 11/001 345/595 |
| 2010/0110101 | A1 | 5/2010 | Relyea et al. | |
| 2010/0333003 | A1* | 12/2010 | Zurmuehl | H04N 1/644 715/765 |
| 2012/0105467 | A1* | 5/2012 | Chao | G06Q 10/10 345/589 |

(Continued)

OTHER PUBLICATIONS

Zhenyu Gu et al. "A Color Schemer for WebPage Design Using interactive Mood Board" Human-Computer Interaction. HUrnan-Centred Design Approaches, Methods, Tools, and Environments, Springer Berlin Heidelberg, Berlin, Heidelberg, Jul. 21, 2013; pp. 555-564.

*Primary Examiner* — Keith D Bloomquist
(74) *Attorney, Agent, or Firm* — Allen, Dyer, Doppelt + Gilchrist, PA (57) ABSTRACT

A computing system includes a server for generating a custom color scheme for a web application. The server determines a source set of colors to be used in the custom color scheme, determines color separation distances between colors in the source set of colors, and a target set of colors in the web application. The server determines the different color position permutations that the colors in the target set of colors can be replaced with the colors in the source set of colors. For each color position permutation, deltas between the color separation distances in the replaced colors and the color separation distances in the source set of colors are determined. One of the color position permutations to be used as the custom color scheme for the web application is selected based on the deltas being minimized with respect to the deltas for the other color position permutations.

20 Claims, 5 Drawing Sheets

(56) References Cited

U.S. PATENT DOCUMENTS

| | | | | |
|---|---|---|---|---|
| 2013/0111324 A1* | 5/2013 | Kern | ................... | G06F 17/218 715/230 |
| 2014/0181160 A1* | 6/2014 | Novak | ................... | G06F 16/48 707/822 |
| 2016/0103800 A1* | 4/2016 | Girault | ................. | G06F 17/272 715/236 |

* cited by examiner

COLOR SCHEME GENERATOR FOR WEB APPLICATIONS

TECHNICAL FIELD

The present disclosure relates to color scheme generators, and more particularly, to a color scheme generator for customizing colors in a web application.

BACKGROUND

Most enterprises would like their web applications to be made available with customized color schemes. The customized color schemes may reflect custom logos, for example. Customized color schemes for web applications allow for better customer experiences.

Each web application includes a number of web pages, and each web page is to be customized by hand. A style sheet for each web page is modified to reflect a particular customized color scheme. Building, configuring and testing color schemes for web applications can be a time consuming process.

SUMMARY

A computing system includes a server configured to generate a custom color scheme for a web application by determining a source set of colors to be used in the custom color scheme, determining color separation distances between colors in the source set of colors, and determine a target set of colors in the web application. The server further determines color position permutations of the colors in the target set of colors that can be replaced with the colors in the source set of colors.

For each color position permutation, the server determines color separation distances between the replaced colors. For each color position permutation, the server determines deltas between the color separation distances in the replaced colors and the color separation distances in the source set of colors. The server then selects one of the color position permutations based on the deltas being minimized with respect to the deltas for the other color position permutations. The selected color position permutation is to be used as the custom color scheme for the web application.

The computing system advantageously automates generation of custom color schemes for web applications based on the colors in the source set of colors. The web applications include, for example, Software as a Service (SaaS) applications. This automation speeds up the color customization process which is typically done by hand.

The server generates a stylesheet to map the source set of colors to the target set of colors based on the selected color position permutation, with the stylesheet being applied a next time the web application is accessed. The web application includes a plurality of web pages, and the server is configured to inspect the plurality of web pages until all colors in all components of the stylesheet are mapped to the source set of colors to achieve consistency over the plurality of web pages.

The computing system further comprises a computing device that includes a user interface for interfacing with the server, and a display for displaying the selected color position permutation for the web application. The server is further configured to adjust the colors in the selected color position permutation based on input from the user interface.

The color separation distances between the colors in the source set of colors and the color separation distances in the replaced colors for each color position permutation are limited to adjacent colors.

The server determines the respective color separation distances using at least one of the following color distance determination methods: an RGB Euclidian distance method, a Cielab Delta E method, and a color tolerance distance method.

The server is further configured to repeat the determining and selecting steps for each color distance determination method, and with the computing system further comprising a computing device that includes a user interface for interfacing with the server, and a display for displaying the selected color position permutations for each color distance determination method. The selected color position permutation associated with one of the color distance determination methods that is selected to be used as the custom color scheme for the web application is based on input from the user interface.

The server is configured to determine the source set of colors based on analyzing at least one of the following: color schemes in a source web application, color schemes in a logo, and a user defined color scheme. If the source set of colors is monochrome, then the server further generates variants of the monochrome colors so as to expand the source set of colors.

Another aspect is directed to a method for generating a custom color scheme for a web application that comprises determining a source set of colors to be used in the custom color scheme, determining color separation distances between colors in the source set of colors, determining a target set of colors in the web application, and determining color position permutations of the colors in the target set of colors in the web application that can be replaced with the colors in the source set of colors. For each color position permutation, color separation distances between the replaced colors are determined. For each color position permutation, deltas between the color separation distances in the replaced colors and the color separation distances in the source set of colors are determined. The method further includes selecting one of the color position permutations based on the deltas being minimized with respect to the deltas for the other color position permutations. The selected color position permutation is to be used as the custom color scheme for the web application.

Yet another aspect is directed to a non-transitory computer readable medium for operating a server to generate a custom color scheme for a web application, and with the non-transitory computer readable medium having a plurality of computer executable instructions for causing the server to perform steps as described above.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Figure 1:
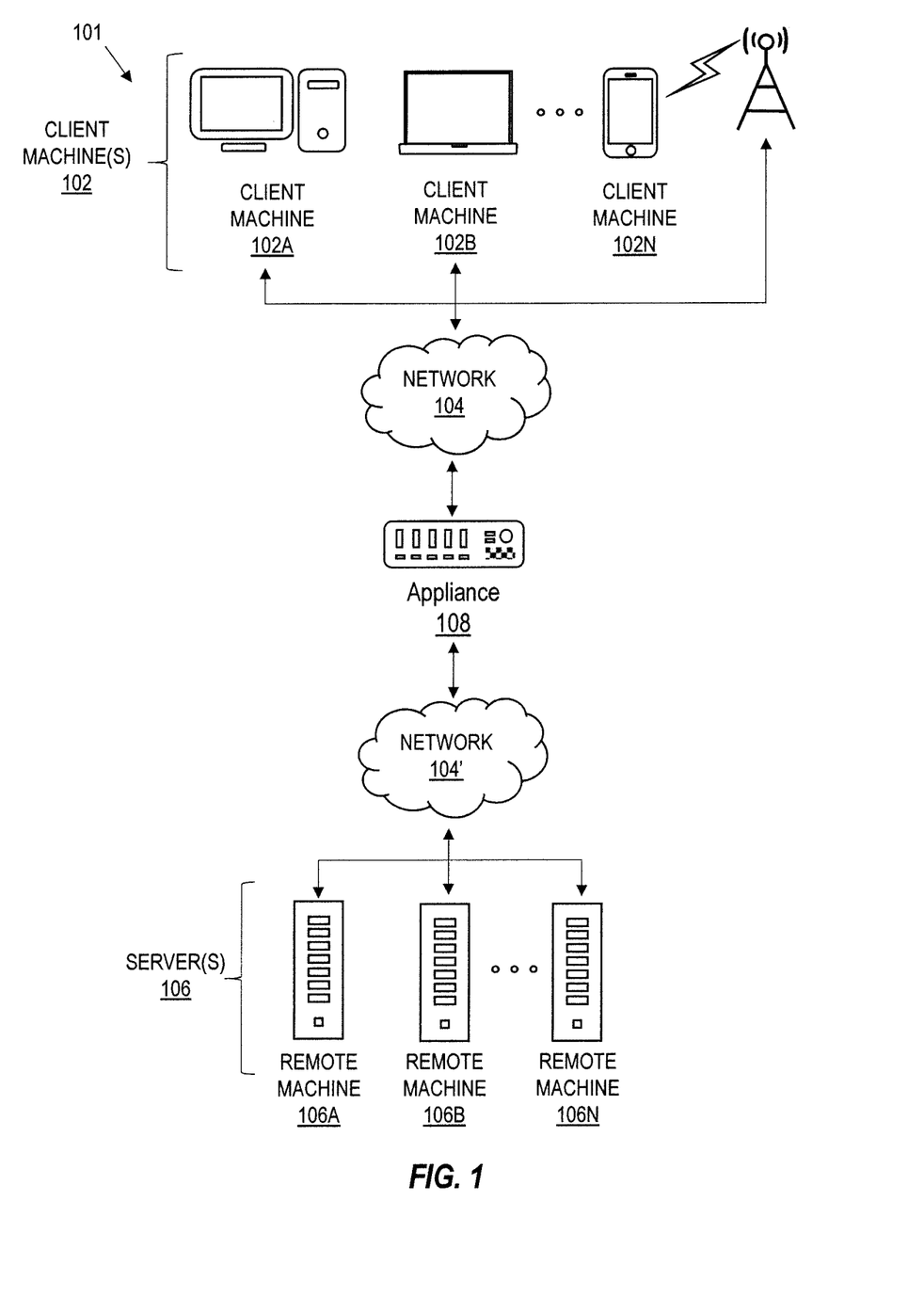
FIG. 1 is a block diagram of a network environment of computing devices in which various aspects of the disclosure may be implemented.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over Internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation client or other client or program that uses a thin-client or a remote-display protocol to capture display output generated by an application executing on a server 106 and transmits the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a WLAN, the protocols may include 802.11, Bluetooth, and Near Field Communication (NFC).

Figure 2:
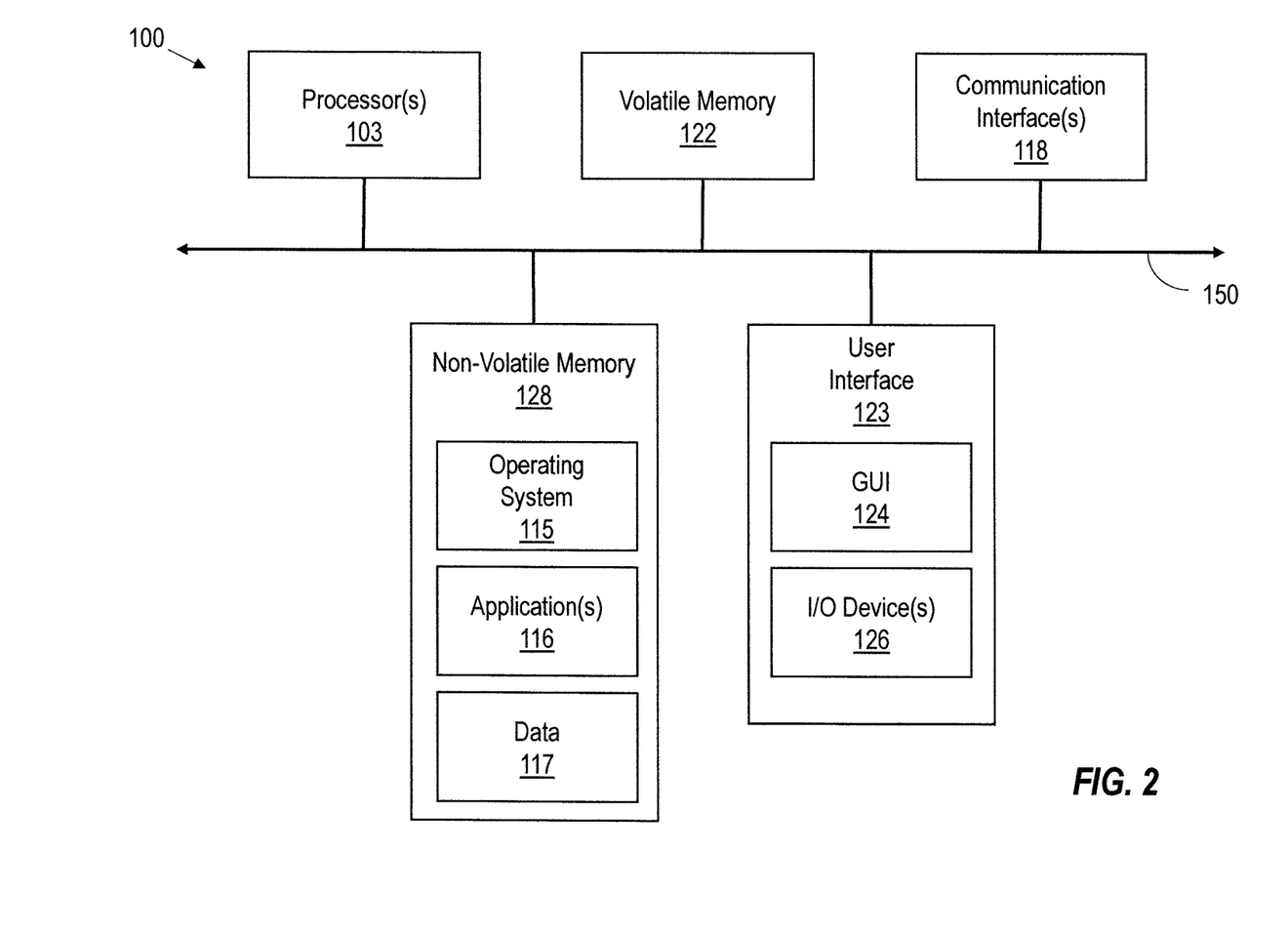
FIG. 2 is a block diagram of a computing device useful for practicing an embodiment of the client machines or the remote machines illustrated in FIG. 1.

FIG. 2 depicts a block diagram of a computing device 100 useful for practicing an embodiment of client devices 102 or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid state storage media; one or more hybrid magnetic and solid state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor may be analog, digital or mixed-signal. In some embodiments, the processor may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

Figure 3:
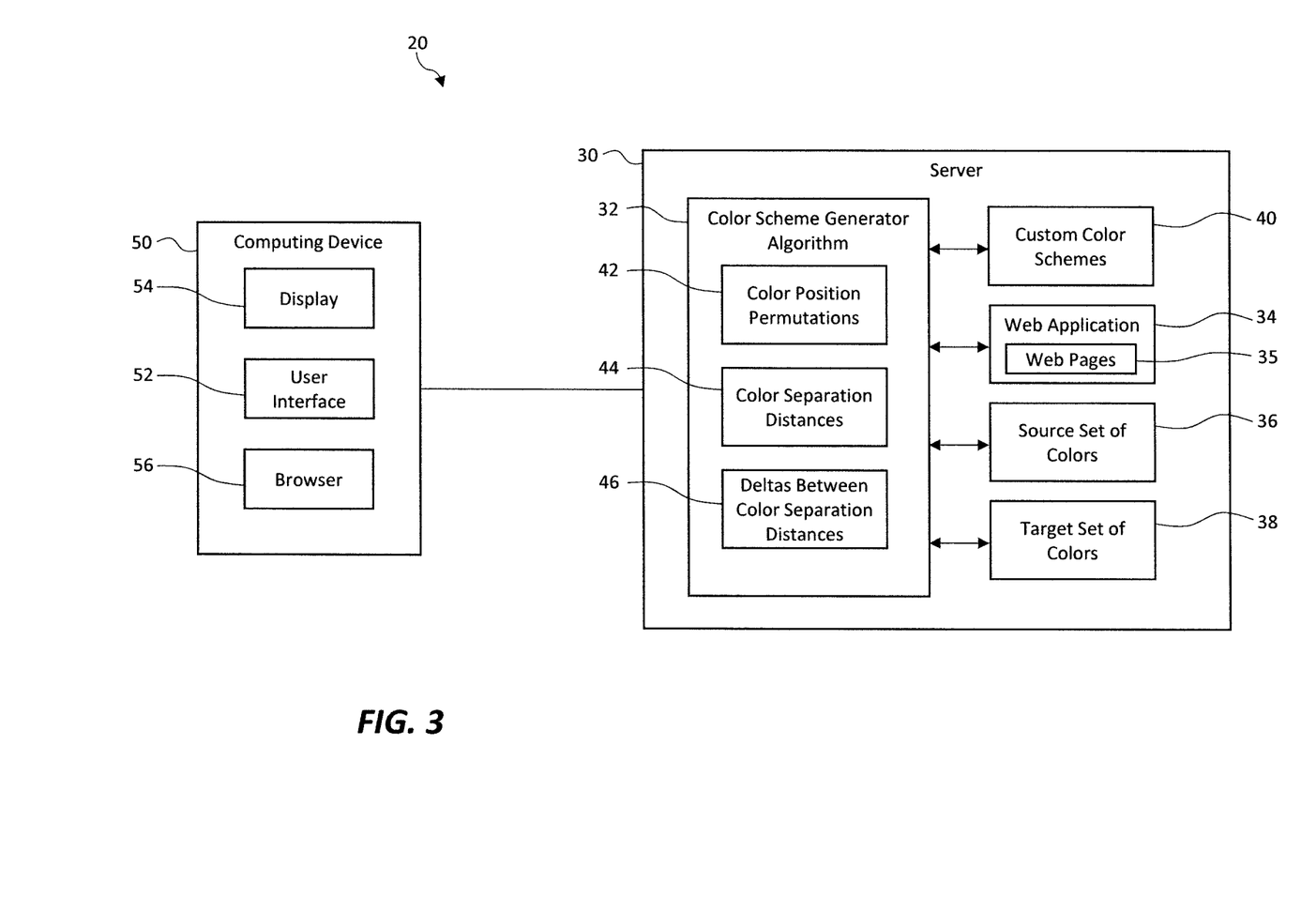
FIG. 3 is a block diagram of a computing system for generating a custom, color scheme for a web application in which various aspects of the disclosure may be implemented.

Referring initially to FIG. 3, a computing system 20 for generating a custom color scheme 40 for a web application 34 will be discussed. The custom color scheme 40 is automatically generated by a server 30 that executes a color scheme generator algorithm 32. The web application 34 may be a Software as a Service (SaaS) application, for example. Each time an update is made to the SaaS application, for example, then a new custom color scheme 40 is to be individually generated for the updated SaaS application so as to match the custom color scheme 40 in the SaaS application before the update. This automation based on the color scheme generator algorithm 32 speeds up the color customization process which is typically done by hand.

The illustrated computing system 20 includes a server 30 and at least one computing device 50. The server 30 includes the color scheme generator algorithm 32 used to determine a source set of colors 36 and a target set of colors 38. As will be explained in detail below, determination of the custom color scheme 40 to be used in the web application 34 is based on the color scheme generator algorithm 32 determining color position permutations 42, color separation distances 44 and deltas 46 between the color separation distances 44 for the different color position permutations 42.

The computing device 50 includes a browser 56 for accessing the color scheme generator algorithm 32 in the server 30. A display 54 is to display the custom color scheme 40 to be used in the web application 34. A user interface 52 is to provide user input to the color scheme generator algorithm 32 as needed.

Execution of the color scheme generator algorithm 32 for generating the custom color scheme 40 for the web application 34 includes determining a source set of colors 36 to be used in the custom color scheme 40, determining color separation distances 44 between colors in the source set of colors 36, and determining a target set of colors 38 in the web application 34.

The color scheme generator algorithm 32 determines color position permutations 42 of the colors in the target set of colors 38 that can be replaced with the colors in the source set of colors 36. For each color position permutation 42, color separation distances 44 are determined between the replaced colors. For each color position permutation 42, deltas 46 between the color separation distances in the replaced colors and the color separation distances 46 in the source set of colors 36 are determined.

The color scheme generator algorithm 32 selects one of the color position permutations 42 based on the deltas 46 being minimized with respect to the deltas 46 for the other color position permutations 42. The selected color position permutation 42 is to be used as the custom color scheme 40 for the web application 34.

The custom color scheme 40 is thus used to map the source set of colors 36 to the target set of colors 38. The color scheme generator algorithm 32 generates a custom color scheme 40 for each web page 25 within the web application 34. In real time, the color scheme generator algorithm 32 generates an application page with the original source set of colors 36 and the web page 25 in the proposed custom color scheme 40.

This is an opportunity for a user of the computing device 50 to review the appearance of both the web page 35 with the proposed custom color scheme 40 applied and the source set of colors 36. The color scheme generator algorithm 32 is configured to adjust, if needed, the colors in the proposed custom color scheme 40 based on input from the user interface.

Figure 4:
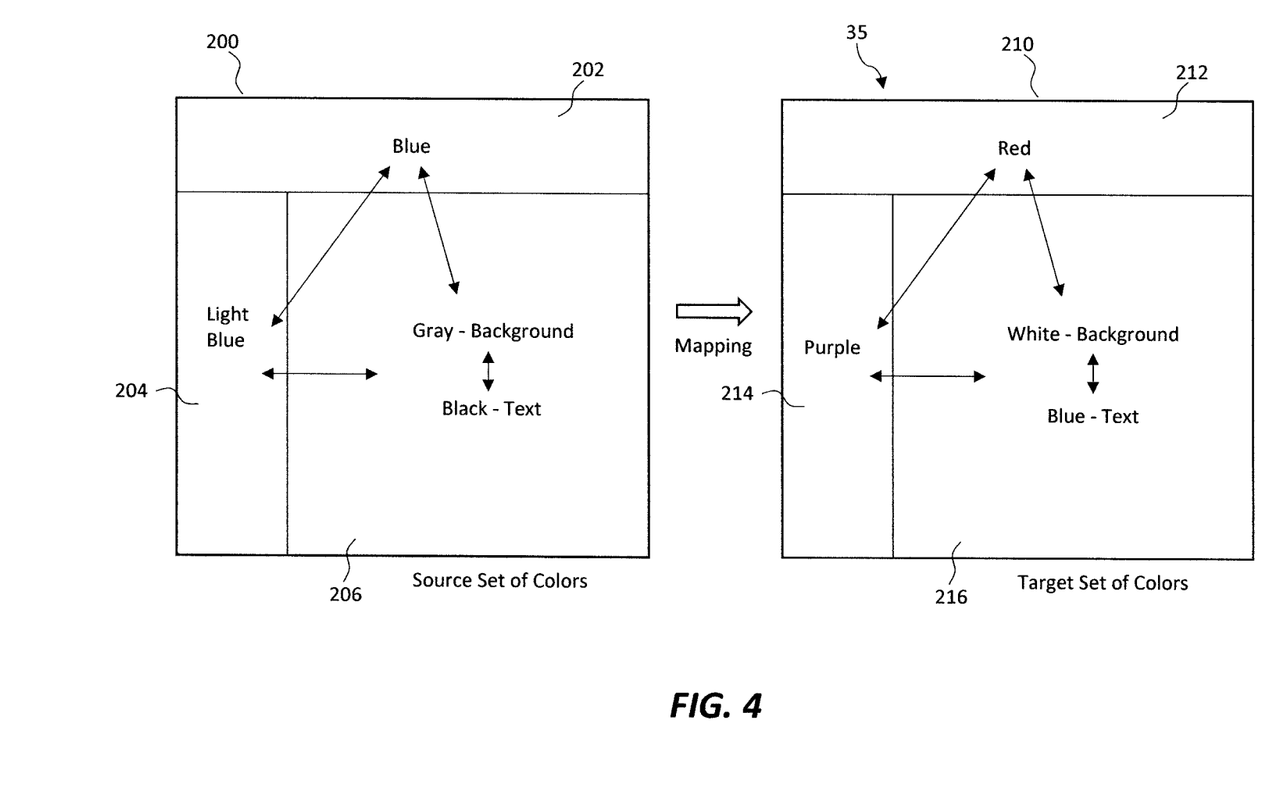
FIG. 4 are screen shots illustrating a source set of colors to be mapped to a target set of colors for generating the custom color scheme for the web application illustrated in FIG. 3.

Referring now to FIG. 4, generation of an example custom color scheme 40 for the web application 34 will be discussed. The color scheme generator algorithm 32 first determines the source set of colors 36. The source set of colors 36 may be determined a number of different ways.

One approach is for the color scheme generator algorithm 32 to analyze color schemes in a source web application. This is accomplished by crawling the source web application to analyze color schemes in dialogs that fit enterprise or corporate requirements. Another approach is to analyze the color scheme of a logo. Yet another approach is to provide a user defined color scheme to the color scheme generator algorithm 32. These approaches are examples and are not to be limiting. If the source set of colors 36 is monochrome, then execution of the color scheme generator algorithm 32 further includes generating variants of the monochrome colors so as to expand the source set of colors 36.

An example source set of colors 36 is provided in screen shot 200. The source set of colors 36 includes blue for display section 202, light blue for display section 204, and gray for display section 206. In addition, anyone of the sections may include text. For example, display section 206 may include black text with a gray background.

After the source set of colors 36 has been determined, then the color scheme generator algorithm 32 determines color separation distances 44 between colors in the source set of colors 36. The color separation distances 44 may be determined using anyone of a number of different color distance determination methods. The color scheme generator algorithm 32 may use a RGB Euclidian distance method, a Cielab Delta E method, or a color tolerance distance method, for example. These example color distance determination methods are not to be limiting as other color distance determination methods may be used by the color scheme generator algorithm 32.

Using screen shot 200 as an example, color separation distances for the source set of colors 36 are determined between display sections 202 and 204, between display sections 202 and 206, and between display sections 204 and 206. The color separation distances 44 are used by the color scheme generator algorithm 32 to determine color contrasts for the colors in the source set of colors 36. Color contrasts between the text and the background are also determined. Maintaining a similar contrast in the custom color scheme 40 that is to be applied to the web application 34 is necessary for providing a pleasant user experience.

Next, the color scheme generator algorithm 32 analyzes color schemes in the web application 34 to determine the target set of colors 38. This is accomplished by crawling the web application 34 to analyze color schemes in its dialogs. The web application 34 may also be referred to as the target web application.

An example target set of colors 38 is provided in screen shot 210. The screen shot 210 corresponds to a particular web page 35 within the web application 34. The target set of colors 38 includes red for display section 212, purple for display section 214, and white for display section 206. In addition, anyone of the sections may include text. For example, display section 216 may include black text with a white background.

After the target set of colors 38 has been determined, the color scheme generator algorithm 32 determines color position permutations 42 of the colors in the target set of colors 38 that can be replaced with the colors in the source set of colors 36. For example, one color position permutation 42 includes display section 212 being replaced by blue, display section 214 being replaced by light blue, and display section 216 being replaced by gray. A next color position permutation 42 includes display section 212 remaining blue but swapping the light blue and gray between display sections 214 and 216.

Yet another color position permutation 42 includes display section 212 being replaced by light blue, display section 214 being replaced by blue, and display section 216 being replaced by gray. A next color position permutation 42 includes display section 212 remaining light blue but swapping the blue and gray between display sections 214 and 216. Determination of the color position permutations 42 continues until all possible color combinations 42 have been determined.

For each color position permutation 42, the color scheme generator algorithm 32 determines color separation distances 44 between the replaced colors. This is similar to the color scheme generator algorithm 32 determining color separation distances between the colors in the source set of colors 36.

The color separation distances 44 for each color position permutation 42 are determined using the same color distance determination method used for determining the color separation distances 44 for the source set of colors 36. As noted above, the color separation distances 44 are used by the color scheme generator algorithm 32 to determine color contrasts for the colors in the source set of colors 36 as well as color contrasts for the colors in each of the color position permutations 42.

For each color position permutation 42, the color scheme generator algorithm 32 determines deltas 46 between the color separation distances 44 in the replaced colors and the color separation distances 44 in the source set of colors 36. The color scheme generator algorithm 32 then selects one of the color position permutations 42 based on the deltas 46 being minimized with respect to the deltas 46 for the other color position permutations 42.

As an example, if the deltas 46 between the color separation distances 44 in the replaced colors in one of the color position permutations 42 and the color separation distances 44 in the source set of colors 36 are high, then this color position permutation 42 would not provide for a pleasant user experience. The contrast between the colors as arranged in the color position permutation 42 is not comparable to the contrast of colors in the source set of colors 36.

Conversely, if the deltas 46 between the color separation distances 44 in the replaced colors in one of the color position permutations 42 and the color separation distances 44 in the source set of colors 36 are low, then this color position permutation 42 would provide for a pleasant user experience.

Based on the color separation distanced deltas 46 between each color position permutation 42 and the source set of colors 36, the color scheme generator algorithm 32 selects the color position permutation 42 having deltas 46 as close to zero as possible when compared to the deltas 46 for the other color position permutations 42. For the color position permutation 42 having the lowest deltas 46, then the contrast of the source colors as mapped into target set of colors 38 more closely matches the contrast of colors in the original source set of colors 36.

Once the color position permutation 42 has been selected, the color scheme generator algorithm 32 generates a custom stylesheet using the custom color scheme 40 corresponding to the color position permutation 42 for the web page 35. The custom stylesheet is applied a next time the web application 34 is accessed.

Since there are multiple web pages 35 in a web application, the color scheme generator algorithm 32 is configured to repeat the determining and selecting steps for each web page 35 in the web application 34. The color scheme generator algorithm 32 generates a custom stylesheet using the custom color scheme 40 for each web page 35.

In some cases, repeating the entire process each web pages 35 can introduce inconsistencies. Since most web applications are dynamic there is typically no finite set of web pages for a web application 34. Alternatively, the server 30 may be configured to inspect the multiple web pages 35 until all colors in all components of the stylesheet are mapped to the source set of colors 36 to achieve consistency over the multiple web pages.

In one approach, the color separation distances 44 as determined by the color scheme generator algorithm 32 are between all colors. Alternatively, the color separation distances 44 as determined by the color scheme generator algorithm 32 are limited to adjacent colors. Being limited to adjacent colors reduces the number of color position permutations 42.

The color scheme generator algorithm 32 is further configured to repeat the determining and selecting steps for different color distance determination methods. The computing system 50 displays the selected color position permutations 42 for each color distance determination method. Depending on which one of the color distance determination methods would provide the most pleasant user experience, as displayed, is selected to be used as the custom color scheme the selection is based on input from the user interface 40 for the web application 34 based on user input.

Figure 5:
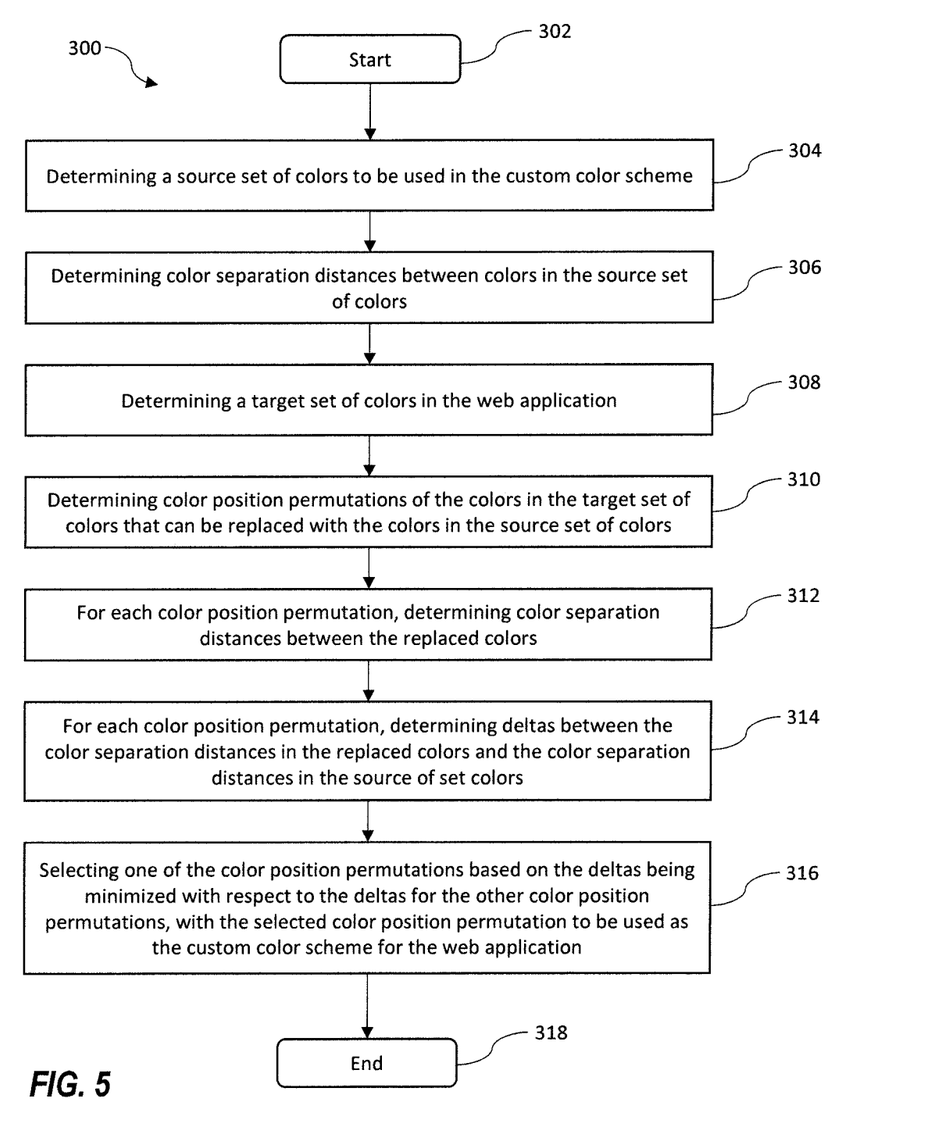
FIG. 5 is a flowchart illustrating a method for generating a custom color scheme for a web application using the server illustrated in FIG. 3.

Referring now to the flowchart 300 in FIG. 5, a method for generating a custom color scheme 40 for a web application 34 includes from the start (Block 302) determining a source set of colors 36 to be used in the custom color scheme 40 at Block 304, and determining color separation distances 44 between colors in the source set of colors 36 at Block 306. The method further includes determining a target set of colors 38 in the web application 34 at Block 308.

Color position permutations 42 of the colors in the target set of colors 38 that can be replaced with the colors in the source set of colors 36 are determined at Block 310. For each color position permutation 42, the method includes determining color separation distances 44 between the replaced colors as Block 312. For each color position permutation 42, the method includes determining deltas 46 between the color separation distances 44 in the replaced colors and the color separation distances 44 in the source set of colors 36 at Block 314.

The method further includes at Block 316 selecting one of the color position permutations 42 based on the deltas 46 being minimized with respect to the deltas 46 for the other color position permutations 42. The selected color position permutation 42 is to be used as the custom color scheme 40 for the web application 34. The method ends at Block 318.

Another aspect is directed to a non-transitory computer readable medium for operating a server 30 to generate a custom color scheme 40 for a web application 34, and with the non-transitory computer readable medium having a plurality of computer executable instructions for causing the server 30 to perform steps that includes determining a source set of colors 36 to be used in the custom color scheme 40, determining color separation distances 44 between colors in the source set of colors 36, and determining a target set of colors 38 in the web application 34.

Color position permutations 42 of the colors in the target set of colors 38 that can be replaced with the colors in the source set of colors 36 are determined. For each color position permutation 42, color separation distances 44 between the replaced colors are determined. For each color position permutation 42, deltas 46 between the color separation distances 44 in the replaced colors and the color separation distances 44 in the source set of colors 36 are determined.

One of the color position permutations 42 is selected based on the deltas 46 being minimized with respect to the deltas 46 for the other color position permutations 42. The selected color position permutation 42 is to be used as the custom color scheme 40 for the web application 34.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed:

1. A computing system comprising:
    a server configured to generate a custom color scheme for a web application by performing the following:
        determine a source set of colors to be used in the custom color scheme,
        determine color separation distances between colors in the source set of colors,
        determine a target set of colors in the web application,
        determine color position permutations of the colors in the target set of colors that can be replaced with the colors in the source set of colors,
        for each color position permutation, determine color separation distances between the replaced colors,
        for each color position permutation, determine deltas between the color separation distances in the replaced colors and the color separation distances in the source set of colors, and
        select one of the color position permutations based on the deltas being minimized with respect to the deltas for the other color position permutations, with the selected color position permutation to be used as the custom color scheme for the web application.

2. The computing system according to claim 1 wherein said server generates a stylesheet to map the source set of colors to the target set of colors based on the selected color position permutation, with the stylesheet being applied a next time the web application is accessed.

3. The computing system according to claim 2 wherein the web application includes a plurality of web pages, and wherein said server is configured to inspect the plurality of web pages until all colors in all components of the stylesheet are mapped to the source set of colors to achieve consistency over the plurality of web pages.

4. The computing system according to claim 1 further comprising a computing device comprising a user interface for interfacing with said server, and a display for displaying the selected color position permutation for the web application.

5. The computing system according to claim 4 wherein said server is further configured to adjust the colors in the selected color position permutation based on input from the user interface.

6. The computing system according to claim 1 wherein the web application is a software as a service (SaaS) application.

7. The computing system according to claim 1 wherein the color separation distances between the colors in the source set of colors and the color separation distances in the replaced colors for each color position permutation are limited to adjacent colors.

8. The computing system according to claim 1 wherein said server determines the respective color separation distances using at least one of the following color distance determination methods: an RGB Euclidian distance method, a Cielab Delta E method, and a color tolerance distance method.

9. The computing system according to claim 8 wherein said server is further configured to repeat the determining and selecting steps for each color distance determination method, and with the computing system further comprising:
 a user interface for interfacing with said server; and
 a display for displaying the selected color position permutations for each color distance determination method;
 with the selected color position permutation associated with one of the color distance determination methods that is to be used as the custom color scheme for the web application is selected based on input from the user interface.

10. The computing system according to claim 1 wherein said server is configured to determine the source set of colors based on analyzing at least one of the following: color schemes in a source web application, color schemes in a logo, and a user defined color scheme.

11. The computing system according to claim 1 wherein if the source set of colors is monochrome, then said server is further configured to generate variants of the monochrome colors so as to expand the source set of colors.

12. A method for generating a custom color scheme for a web application comprising:
 determining a source set of colors to be used in the custom color scheme;
 determining color separation distances between colors in the source set of colors;
 determining a target set of colors in the web application;
 determining color position permutations of the colors in the target set of colors that can be replaced with the colors in the source set of colors;
 for each color position permutation, determining color separation distances between the replaced colors;
 for each color position permutation, determining deltas between the color separation distances in the replaced colors and the color separation distances in the source set of colors; and
 selecting one of the color position permutations based on the deltas being minimized with respect to the deltas for the other color position permutations, with the selected color position permutation to be used as the custom color scheme for the web application.

13. The method according to claim 12 further comprising generating a stylesheet to map the source set of colors to the target set of colors based on the selected color position permutation, with the stylesheet being applied a next time the web application is accessed.

14. The method according to claim 13 wherein the web application includes a plurality of web pages, and further comprising inspecting the plurality of web pages until all colors in all components of the stylesheet are mapped to the source set of colors to achieve consistency over the plurality of web pages.

15. The method according to claim 12 further comprising:
 displaying the selected color position permutation for the web application; and
 adjusting the colors in the selected color position permutation based on user input.

16. The method according to claim 12 wherein the web application is a software as a service (SaaS) application.

17. A non-transitory computer readable medium for operating a server to generate a custom color scheme for a web application, and with the non-transitory computer readable medium having a plurality of computer executable instructions for causing the server to perform steps comprising:
 determining a source set of colors to be used in the custom color scheme;
 determining color separation distances between colors in the source set of colors;
 determining a target set of colors in the web application;
 determining color position permutations of the colors in the target set of colors that can be replaced with the colors in the source set of colors;
 for each color position permutation, determining color separation distances between the replaced colors;
 for each color position permutation, determining deltas between the color separation distances in the replaced colors and the color separation distances in the source set of colors; and
 selecting one of the color position permutations based on the deltas being minimized with respect to the deltas for the other color position permutations, with the selected color position permutation to be used as the custom color scheme for the web application.

18. The non-transitory computer readable medium according to claim 17 further comprising generating a stylesheet to map the source set of colors to the target set of colors based on the selected color position permutation, with the stylesheet being applied a next time the web application is accessed.

19. The non-transitory computer readable medium according to claim 18 wherein the web application includes a plurality of web pages, and further comprising inspecting the plurality of web pages until all colors in all components of the stylesheet are mapped to the source set of colors to achieve consistency over the plurality of web pages.

20. The non-transitory computer readable medium according to claim 17 wherein the color separation distances between the colors in the source set of colors and the color separation distances in the replaced colors for each color position permutation are limited to adjacent colors.

* * * * *